US010919239B2

(12) United States Patent
Osborne

(10) Patent No.: US 10,919,239 B2
(45) Date of Patent: Feb. 16, 2021

(54) METHOD AND SYSTEM FOR FABRICATING A COMPOSITE STRUCTURE

(71) Applicant: The Boeing Company, Chicago, IL (US)

(72) Inventor: Max Marley Osborne, Victoria (AU)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 15/623,227

(22) Filed: Jun. 14, 2017

(65) Prior Publication Data

US 2018/0056610 A1   Mar. 1, 2018

(30) Foreign Application Priority Data

Aug. 29, 2016   (AU) .................... 2016219741

(51) Int. Cl.
| | | |
|---|---|---|
| *B29C 70/38* | (2006.01) | |
| *B29C 70/86* | (2006.01) | |
| *B29C 70/44* | (2006.01) | |
| *B29C 70/34* | (2006.01) | |
| *B29C 53/60* | (2006.01) | |
| *B29C 70/32* | (2006.01) | |
| *B29K 105/08* | (2006.01) | |
| *B29K 307/04* | (2006.01) | |

(52) U.S. Cl.
CPC ............ *B29C 70/388* (2013.01); *B29C 53/60* (2013.01); *B29C 70/32* (2013.01); *B29C 70/342* (2013.01); *B29C 70/386* (2013.01); *B29C 70/446* (2013.01); *B29C 70/86* (2013.01); *B29K 2105/0872* (2013.01); *B29K 2307/04* (2013.01)

(58) Field of Classification Search
USPC .... 264/571; 156/156, 173, 195, 431, 244.13
See application file for complete search history.

(56) References Cited

U.S. PATENT DOCUMENTS

| | | | |
|---|---|---|---|
| 2,739,350 A | | 3/1956 | Lampman |
| 3,700,519 A | * | 10/1972 | Carter ................ B29C 53/60 |
| | | | 156/156 |
| 3,713,753 A | | 1/1973 | Brunsch |
| 3,847,707 A | | 11/1974 | Meyer et al. |
| 3,943,090 A | | 3/1976 | Enever |

(Continued)

FOREIGN PATENT DOCUMENTS

| | | |
|---|---|---|
| FR | 1384909 | 1/1965 |
| FR | 2198822 | 4/1974 |

(Continued)

OTHER PUBLICATIONS

"Stretch Wrapping Solution for Long Loads & Packages" brochure retrieved from [http://www.austwarehouse.com.au/fromm-fv215] on Jun. 5, 2017.

(Continued)

*Primary Examiner* — Lynda Salvatore
(74) *Attorney, Agent, or Firm* — McDonnell Boehnen Hulbert & Berghoff LLP

(57) ABSTRACT

A method and system for fabricating a composite structure is provided. At least a first layer of reinforcement material is placed on a surface of a tool. At least a first layer of veil material is then wrapped around the first layer of reinforcement material while the first layer of reinforcement material is positioned on the tool to produce a first reinforced ply.

20 Claims, 7 Drawing Sheets

(56) References Cited

U.S. PATENT DOCUMENTS

| | | |
|---|---|---|
| 4,141,929 A | 2/1979 | Stoops et al. |
| 5,028,478 A | 7/1991 | Odagiri et al. |
| 5,605,745 A | 2/1997 | Recker et al. |
| 6,503,856 B1 | 1/2003 | Broadway et al. |
| 6,740,185 B2 | 5/2004 | Baldwin |
| 7,037,865 B1 | 5/2006 | Kimberly |
| 7,435,693 B2 | 10/2008 | Tsotsis et al. |
| 7,815,160 B2 * | 10/2010 | Stenard ............ B29C 53/82 156/307.1 |
| 8,080,313 B2 | 12/2011 | Bonneau et al. |
| 8,088,470 B2 | 1/2012 | Dolby |
| 8,101,806 B2 | 1/2012 | Ellis |
| 9,312,827 B2 | 4/2016 | Qureshey et al. |
| 9,662,843 B2 * | 5/2017 | Bennett ............ B29C 33/485 |
| 2005/0006301 A1 | 1/2005 | Angelini et al. |
| 2006/0191115 A1 | 8/2006 | Carter et al. |
| 2006/0269738 A1 | 11/2006 | Kimberly |
| 2009/0110901 A1 | 4/2009 | Gaw et al. |
| 2009/0130376 A1 | 5/2009 | Berkel et al. |
| 2012/0064283 A1 | 3/2012 | Hill et al. |
| 2013/0065471 A1 | 3/2013 | Mortimer |
| 2013/0143006 A1 | 6/2013 | Ferguson |
| 2014/0200130 A1 | 7/2014 | Szweda et al. |
| 2014/0265043 A1 * | 9/2014 | Oldroyd ............ B29C 41/085 264/482 |

FOREIGN PATENT DOCUMENTS

| | | |
|---|---|---|
| WO | 9921697 A1 | 5/1999 |
| WO | WO 2007/115239 | 10/2007 |

OTHER PUBLICATIONS

Extended European Search Report prepared by the European Patent Office in application No. 17176809.6 dated Jan. 24, 2018.

\* cited by examiner

METHOD AND SYSTEM FOR FABRICATING A COMPOSITE STRUCTURE

FIELD

The present disclosure generally relates to the fabrication of composite structures and in particular relates to a method and system for fabricating a composite structure.

BACKGROUND

It is known to form composite carbon fibre structures using one or more layers of veil material between layers of carbon fibre ply. Veil materials are typically a low areal weight network of filaments, which are applied between the layers of structural carbon fibre tape or fabric.

Veil materials may consist of one or many types of materials such as thermoplastic, nylon, carbon or glass fibres. The purpose of the layer of veil material is multi-functional. Some of the key uses include improved mechanical performance and properties through toughening mechanisms (improved composite toughness through increased inter-laminar strength and inter-layer crack arrestment).

The layer or layers of veil material may also offer composite manufacturing benefits by introducing a stabilising material into the layup. When activated by heat, the veil material lightly bonds together the layers of carbon to create a stabilised uncured material format called a 'stabilized preform', which is able to be handled and subjected to subsequent operations. Stabilising dry fibre tape, woven, braided or stitched fabric formats also allows cutting and physical handling without degrading. An additional benefit of the layer of veil material in the preform is that the separation between reinforcing plies allows for extraction of air and volatiles and, in the case of liquid moulded or resin infused composites, a complete permeation of resin throughout the dry fibre matrix.

The layer or layers of veil material has been traditionally applied to the carbon fibre fabric or tape at the raw commodity material level using operations such as melt bonding, where a sheet of the veil material is laid on top of the fabric and pressed and heated to bond the veil material to one or both sides of the dry fabric. This method is effective for certain manufacturing methods and products, for example large and comparatively flat surfaces such as composite airplane skins. However, this method is less compatible with other manufacturing methods for components having contoured shapes, such as stiffeners, stringers, tubes, ducts, C-section or I-section frames and beams.

One specific application of a layer or layers of veil material is in low pressure resin infused composite manufacturing processes, where low viscosity resins are typically used to maximise resin flow throughout large or complex-shaped dry fibre reinforcements or preforms. Such components, which do not have a layer of veil material, use a tough and high viscosity resin system to achieve desired mechanical properties. Highly viscous resin systems can be processed using a high pressure (autoclave) manufacturing process in order to fully infuse the preform with resin and to cure the composite without defects. Viscous resins may be infused through the preform over short distances, but can be unsuitable for large structures. A high-pressure (autoclave) process can also drive significantly higher recurring and capital costs as compared with a low-pressure material system with a layer of veil material that may be cured using vacuum pressure and an oven or heated tooling equipment.

The present disclosure is made bearing the above problems in mind.

SUMMARY

The present disclosure is generally directed to a method and system for fabricating a composite structure. According to embodiments of the present disclosure, at least a first layer of veil material is wrapped around one or both sides of a layer of reinforcement material, while the first layer of reinforcement material is positioned on a tool, to produce a first reinforced ply.

According to one aspect, the present disclosure provides a method of fabricating a composite structure. At least a first layer of reinforcement material is placed on a surface of a tool. At least a first layer of veil material is then wrapped around the first layer of reinforcement material while the first layer of reinforcement material is positioned on the tool to produce a first reinforced ply.

In certain embodiments, the method further comprises placing at least a second layer of reinforcement material on the first layer of veil material while the first reinforced ply is positioned on the tool surface. The method preferably further comprises wrapping at least a second layer of veil material around the second layer of reinforcement material while the second layer of reinforcement material is positioned on the tool, the second layer of reinforcement material and the second layer of veil material forming a second reinforced ply on the first reinforced ply.

In certain embodiments, the step of placing the first layer of reinforcement material on the tool surface comprises placing the first layer of reinforcement material on a surface of a mandrel or a forming tool.

In certain embodiments, the step of wrapping the layer of veil material comprises relative axial rotation and longitudinal movement between the tool surface and the underlying layer of veil material to spirally wrap the layer of veil material around the underlying layer of reinforcement material. In one form, the speed of the relative axial rotation and longitudinal movement between the tool surface and the layer of veil material is substantially constant during the wrapping so as to provide a substantially constant spacing between, or substantially constant overlap of, adjacent pitches of the layer of veil material. In another form, the speed of the relative axial rotation and longitudinal movement between the tool surface and the layer of veil material is varied during the wrapping so as to provide a variable spacing between, or variable overlap of, adjacent pitches of the layer of veil material. The step of wrapping the layer of veil material preferably comprises rotating the tool surface about an axis, whilst keeping the tool surface longitudinally stationary, and longitudinally advancing the layer of veil material. Alternatively, the step of wrapping the layer or layers of veil material comprises keeping the tool surface axially and longitudinally stationary whilst rotating the veil material axially around the tool surface and longitudinally advancing the layer of veil material.

In certain embodiments, the tension applied to the layer or layers of veil material is substantially constant during the wrapping. In alternative embodiments, the tension applied to the layer or layers of veil material is varied during the wrapping.

In certain embodiments, the method further comprises adding a resin to at least the first reinforced ply to form a composite layup, and curing the resin in the composite layup to form the composite structure. In one form, the resin is infused to form a resin infused composite layup. In another form, the resin is injected to form a resin injected composite layup.

In certain embodiments, the method further comprises cutting at least the first layer of veil material at the completion of the wrapping at least the first layer of veil material around the first layer of reinforcement material.

In certain embodiments, the method further comprises heating at least the first reinforced ply to form at least a first stabilized preform.

According to another aspect, the present disclosure provides a system for fabricating a composite structure. A tool having a surface for supporting at least a first layer of reinforcement material placed on the tool surface. A wrapping device configured to wrap at least a first layer of veil material around the first layer of reinforcement material while the first layer of reinforcement material is positioned on the tool to produce a first reinforced ply.

In certain embodiments, the tool is configured to support at least a second layer of reinforcement material on the first reinforced layer. The wrapping device is preferably configured to wrap at least a second layer of veil material around the second layer of reinforcement material to produce a second reinforced ply on the first reinforced ply.

In certain embodiments, the tool comprises a mandrel.

In certain embodiments, the system further comprises a drive device configured to cause relative axial rotation and longitudinal movement between the tool and the wrapping device such that the layer of veil material is spirally wrapped around the layer of underlying reinforcement material while the underlying layer of reinforcement material is positioned on the tool. In one form, the drive device is configured to provide a substantially constant speed of the relative axial rotation and longitudinal movement between the tool and the wrapping device so as to provide a substantially constant spacing between, or substantially constant overlap of, adjacent pitches of at least one of the first layer of veil material or the second layer of veil material. In another form, the drive device is configured to provide a variable speed of the relative axial rotation and longitudinal movement between the tool and the wrapping device so as to provide a variable spacing between, or variable overlap of, adjacent pitches of at least one of the first layer of veil material and the second layer of veil material.

In certain embodiments, the tool is longitudinally stationary and axially rotatable and the wrapping device is longitudinally advanceable and axially stationary. In alternative embodiments, the tool is longitudinally and axially stationary tool and the wrapping device is longitudinally advanceable and axially rotatable.

In certain embodiments, the system further comprises a veil material tensioner adapted to apply tension to at least one of the first layer of veil material and the second layer of veil material relative to the tool. In one form, the veil material tensioner is configured to apply a substantially constant tension to at least one of the first layer of veil material and the second layer of veil material relative to the tool. In another form, the veil material tensioner is configured to apply a variable tension to at least one of the first layer of veil material and the second layer of veil material relative to the tool.

In certain embodiments, the system further comprises a resin supplier configured to add a resin to the first reinforced ply to form a composite layup. A heat source is configured to heat the composite layup to cure the resin and form the composite structure. A vacuum bag is configured to contain the composite layup during curing.

In certain embodiments, the resin supplier is configured to infuse the resin to form a resin infused composite layup. In alternative embodiments, the resin supplier is configured to inject the resin to form a resin injected composite layup.

In certain embodiments, the reinforcement material is formed from carbon fibre.

In alternative embodiments, the reinforcement material includes, glass, aramid, silicon carbide, boron, ceramic or metallic fibres.

According to yet another aspect, the present disclosure provides a composite structure. At least a first layer of reinforcement material is shaped by a surface of a tool. At least a first layer of veil material is wrapped around the shaped first layer of reinforcement material. The first layer of reinforcement material having the wrapped first layer of veil material forms a first reinforced ply. Resin is added to the first reinforced ply to form an injected composite layup that forms the composite structure after curing the resin.

In certain embodiments, the resin is infused to form a resin infused composite layup. In alternative embodiments, the resin is injected to form a resin injected composite layup.

In certain embodiments, the composite structure further comprises at least a second layer of reinforcement material positioned around the first reinforced ply and at least a second layer of veil material wrapped around the second layer of reinforcement material, the second layer of reinforcement material having the wrapped second layer of veil material forming a second reinforced ply on the first reinforced ply.

In certain embodiments, layer or layers of reinforcement material shaped by the surface of the tool are shaped on a mandrel.

In certain embodiments, the reinforcement material is formed from carbon fibre. In alternative embodiments, the reinforcement material includes, glass, aramid, silicon carbide, boron, ceramic or metallic fibres.

According to an additional aspect, the present disclosure provides a composite structure fabricated in accordance with the method above.

According to a further aspect, the present disclosure provides a composite structure fabricated by the system above.

The features described above may be implemented independently in various embodiments of the present disclosure or may be combined in the other embodiments as will be appreciated by persons skilled in the art.

DRAWINGS

Preferred embodiments of the present disclosure will now be described, by way of examples only, with reference to the accompanying drawings wherein.

DETAILED DESCRIPTION

Method and system according to exemplary or embodiments of the present disclosure will now be described in detail. In general, methods of fabricating a composite structure according to the present disclosure include placing at least the first layer of reinforcement material on a surface of a tool. At least the first layer of veil material is wrapped around the first layer of reinforcement material while the first layer of reinforcement material is positioned on a tool to produce a first reinforced ply. A resin is added to at least the first reinforced ply to form a composite layup (also referred to as a "preform"). The resin supplied to the preform is cured to form the composite structure. The terms "composite layup" and "preform" may be used interchangeably herein. The term "stabilized preform" as used herein refers to composite layup (preform) that has been intermediately heated to stabilize the composite layup (preform).

Now referring to FIGS. 1 to 13 of the accompanying drawings, a method and system for fabricating a composite structure according to a particular embodiment will be described. The method and system can be used to form a composite part from a layer of reinforcement material, such as a layer of woven or braided carbon fibre material. More specifically, the reinforcement material used with the systems and methods described herein can be formed from carbon fibre and/or include glass, aramid, silicon carbide, boron, ceramic, and/or metallic fibres. As described in more detail below, the layer of reinforcement material is formed as a continuous tube having open ends such that the layer is a sleeve 22.

Figure 1:
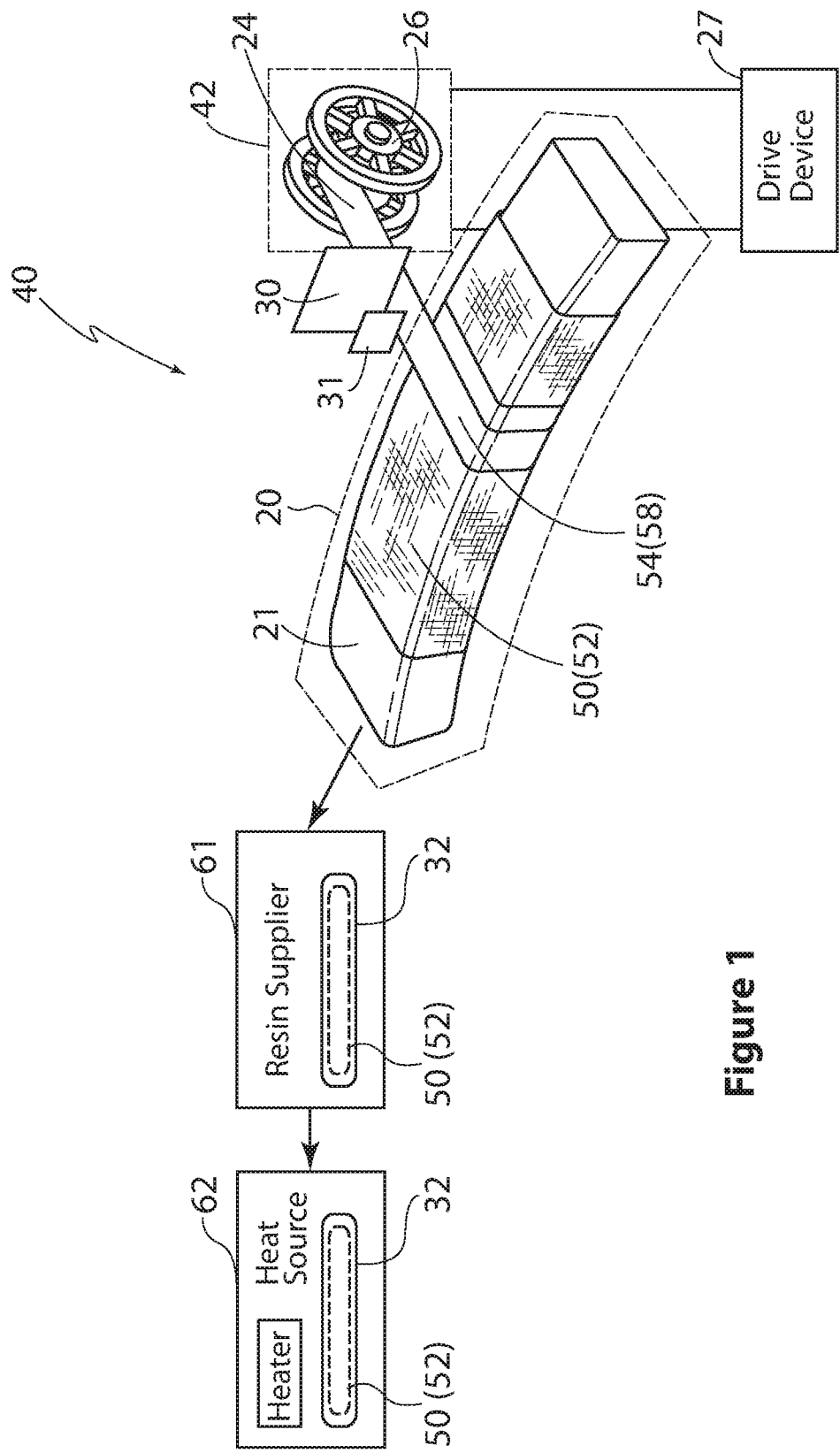
FIG. 1 is a schematic view of an embodiment of a system for fabricating a composite structure.
Figure 2:
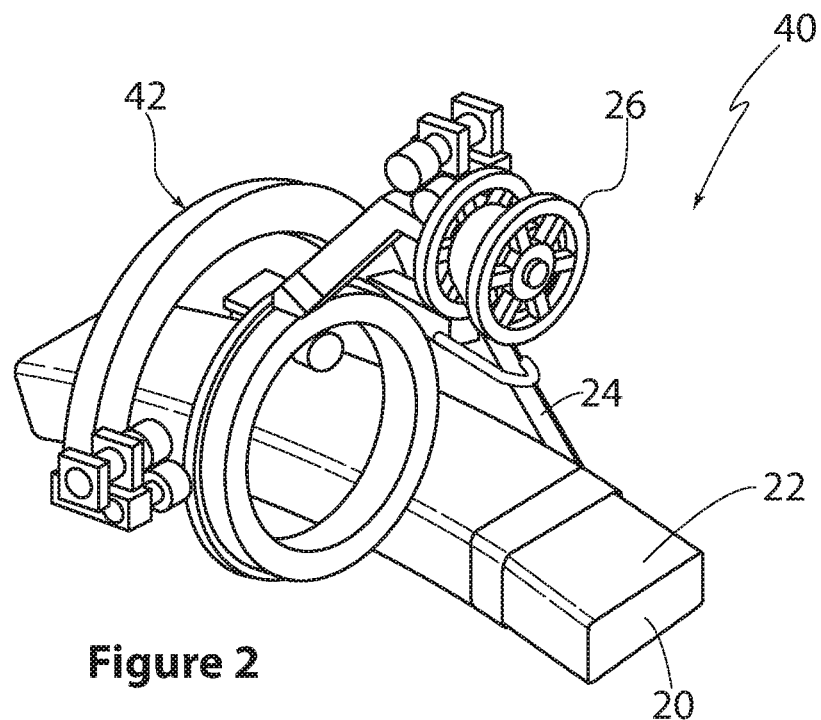
FIG. 2 is a perspective view of an embodiment of a system for fabricating a composite structure.
Figure 3:
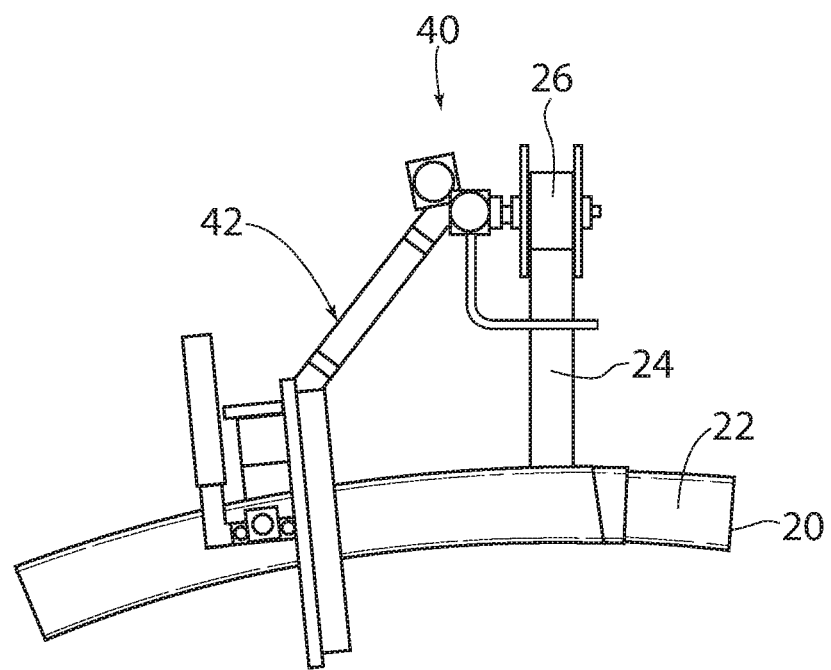
FIG. 3 is a further perspective view of the system device shown in FIG. 2.

As also described in more detail below and as shown in FIGS. 1, 2 and 3, a system 40 includes a tool (in the form of a mandrel 20) and a wrapping device 42. The mandrel 20 has a surface 21 for supporting at least a first layer 50 of reinforcement material placed on the surface 21. The mandrel 20 is further configured to support at least a second layer 52 of reinforcement material on a first reinforced ply 56 when a composite structure 38 (see FIG. 13) will include a plurality of layers of reinforcement material.

Further, the mandrel 20 has a shape corresponding to the desired final shape of the composite structure 38 formed from the sleeve 22. Depending on the desired shape of the composite structure 38 to be made, the mandrel 20 can have a rectangular cross-sectional shape, as shown in the Figures, but may have any suitable cross-sectional shape depending on the composite structure being formed. In the particular embodiment described below, mandrel 20 is elongated along an axis 20a. The mandrel 20 can be straight, arcuate, or any other suitable shape along a length of the mandrel 20.

The wrapping device 42 is configured to wrap at least a first layer 54 of veil material 24 around the first layer 50 of reinforcement material while the first layer 50 of reinforcement material is positioned on the mandrel 20 to produce the first reinforced ply 56. When the composite structure will include a plurality of layers of veil material 24, the wrapping device 42 is configured to wrap at least a second layer 58 of veil material 24 around the second layer 52 of reinforcement material to produce a second reinforced ply 60 on the first reinforced ply 56. The first reinforced ply 56 and the second reinforced ply 60 on the first reinforced ply 56 are referred to as a composite layup (preform). The composite layup (preform) may include more than two reinforced plies.

The mandrel 20 and the wrapping device 42 are configured to move relative to each other. For example, the mandrel 20 is longitudinally stationary and axially rotatable, and the wrapping device 42 is longitudinally advanceable and axially stationary. Alternatively, the mandrel 20 is longitudinally and axially stationary, and the wrapping device 42 is longitudinally advanceable and axially rotatable. It is also contemplated that the mandrel 20 and the wrapping device 42 are selectively longitudinally advanceable and axially rotatable to provide any desired relative movement between the mandrel 20 and the wrapping device 42.

The system 40 can further include a drive device 27 configured to cause the above described relative movement between the mandrel 20 and the wrapping device 42. More specifically, the drive device 27 is configured to cause relative axial rotation and longitudinal movement between the mandrel 20 and the wrapping device 42 such that the layer 54 and/or 58 of veil material is spirally wrapped around the layer 50 and/or 52 of underlying reinforcement material while the underlying layer 50 and/or 52 of reinforcement material is positioned on the mandrel 20. The drive device 27 is included in the system 40 to provide at least some automation of the manufacture of the composite structure 38.

The drive device 27 is configured to provide a substantially constant speed of the relative axial rotation and longitudinal movement between the mandrel 20 and the wrapping device 42 so as to provide a substantially constant spacing between, or substantially constant overlap of, adjacent pitches of at least one of the first layer 54 of veil material or the second layer 58 of veil material. The drive device 27 is alternatively or additionally configured to provide a variable speed of the relative axial rotation and longitudinal movement between the mandrel 20 and the wrapping device 42 so as to provide a variable spacing between, or variable overlap of, adjacent pitches of at least one of the first layer 54 of veil material and the second layer 58 of veil material. The drive device 27 can also be configured to provide substantially constant spacing at one portion of the layer 54 and/or 58 of veil material and variable spacing at another portion of the layer 54 and/or 58 of veil material. The drive device 27 can include any suitable mechanisms that enable the drive device 27 to function as described herein. For example, the drive device 27 can include a motor and/or solenoid.

A tensioner 30 is positioned with respect to the wrapping device 42 and the mandrel 20, such that tensioner 30 can apply a tension force to the veil material 24 relative to the mandrel 20. The tensioner 30 is configured to apply a substantially constant tension to at least one of the first layer 54 of veil material 24 and the second layer 58 of veil material relative to the mandrel 20. Alternatively or additionally, the tensioner 30 is configured to apply a variable tension to the first layer 54 of veil material 24 and/or the second layer 58 of veil material relative to the mandrel 20. More specifically, the tensioner 30 is configured to apply a substantially constant and/or variable tension to the first layer 54 and/or the second layer 58 of veil material 24 where the layer 54 and/or layer 58 extends between the wrapping device 42 and the mandrel 20. The tensioner 30 can be a brake 30a (see FIG. 8) controlling a spool 26 in the wrapping device 42 or can be a spring pulley arrangement 30b (see FIG. 9). However, the tensioner 30 can be any suitable device that applies a tension force to the first layer 54 and/or second layer 58 of veil material.

The system 40 can also include a cutting device 31, positioned between the spool 26 and the tensioner 30. The cutting device 31 cuts the veil material 24 when the wrapping of the veil material 24 for the first layer 54 and/or second layer 58 is completed. The cutting device 31 can be manual, such as scissors, or automated, such as a powered blade or other device.

In at least some embodiments, the system 40 further includes a resin supplier 61, a heat source 62, and a vacuum bag 32. The resin supplier 61 is configured to add a resin to the composite layup (such as the composite layup 23 shown in FIG. 10) having at least the first reinforced ply 56 and second reinforced ply 60. The resin supplier 61 is configured to infuse or inject the resin to the composite layup 23 having the first reinforced ply 56 and the second reinforced ply 60. The heat source 62 is configured to heat the first reinforced ply 56, the second reinforced ply 60 and resin to cure the resin and form a composite preform or the composite structure 38. During curing, the vacuum bag 32 is configured to surround the first reinforced ply 56 or the first and second reinforced plies 56, 60 and resin and to apply pressure during heating.

Figure 4:
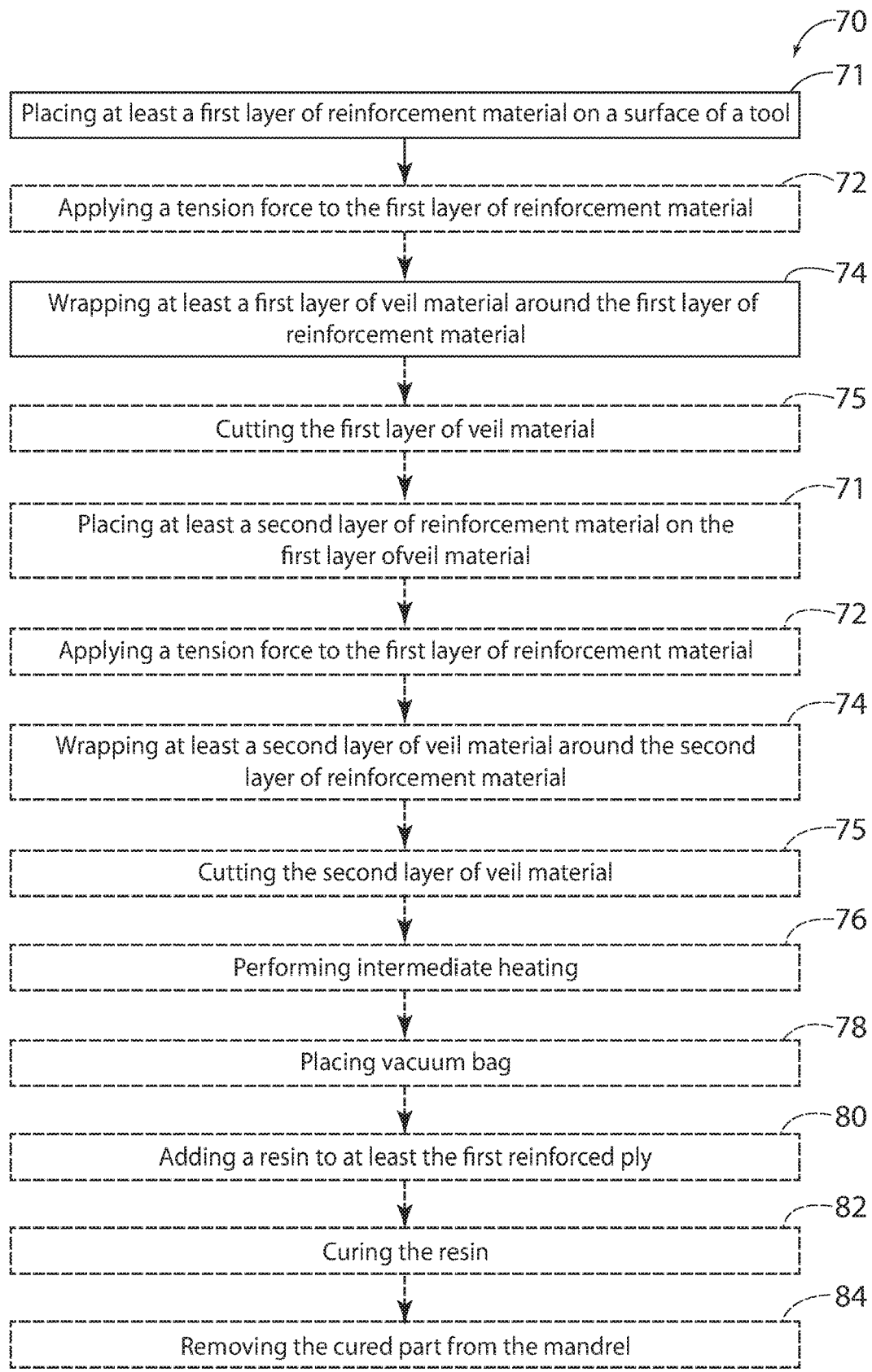
FIG. 4 is a flow chart of an embodiment of a method for fabricating a composite structure.
Figure 13:
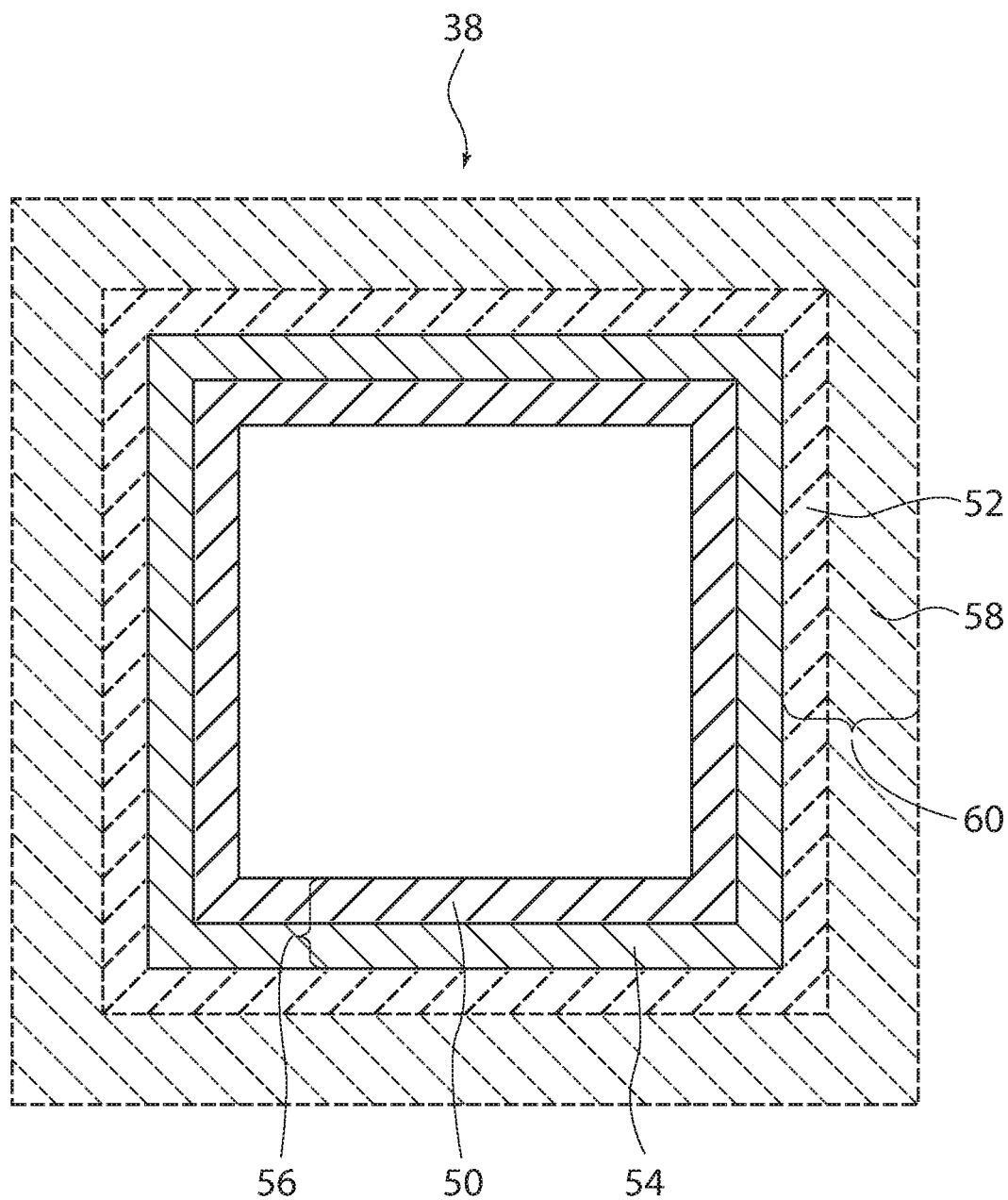
FIG. 13 is a schematic cross sectional end view of an embodiment of a composite structure.

FIG. 4 is a flow chart of an embodiment of a method 70 for fabricating the composite structure 38 (shown in FIG. 13). The method 70 includes placing 71 at least the layer 50 of reinforcement material (i.e., sleeve 22) on the surface 21 of the mandrel 20. In a particular embodiment, a tension force is applied 72 to the layer 54 of reinforcement material (i.e., sleeve 22) to conform the layer 54 to the shape of the mandrel 20. For example, when the sleeve 22 is used as the layer 54 of reinforcement material, tension is applied 72 to the ends 22a, 22b of the sleeve 22 to conform the sleeve 22 to the shape of the mandrel 20 after the layer 54 of the reinforcement material is placed 71 on the mandrel 20. The method 70 further includes wrapping 74 the veil material 24 around the layer 54 of reinforcement material while the layer 54 of reinforcement material is positioned on the mandrel 20 to produce the first reinforced ply 56.

At the completion of the wrapping 74, the veil material 24 is cut 75, for example by the cutting device 31. The placing 71, wrapping 74 and cutting 75 steps can be repeated as necessary until the desired layers 50, 52 of the reinforcement material and the layers 54, 58 of the veil material 24 are built up.

Optionally, the method 70 includes performing an intermediate heating step 76 on the reinforcement material and the veil material 24 so as to produce a stabilized preform. The stabilized preform can take the place of the composite layup in the description below when the intermediate heating step 76 is performed.

The vacuum bag 32 can be placed 78 on the one or more of the reinforced plies 56, 60 on the mandrel 20. The one or more reinforced plies 56, 60 may or may not have been heated to produce a stabilized preform before bagging 78.

Resin 34 is injected or infused 80 to form a resin injected composite layup or resin infused composite layup. Heat 36 is applied to cure 82 the composite layup into the composite structure 38. The composite structure 38 can be trimmed, and the mandrel 20 can be removed 84 to release the composite structure 38.

Figure 5:
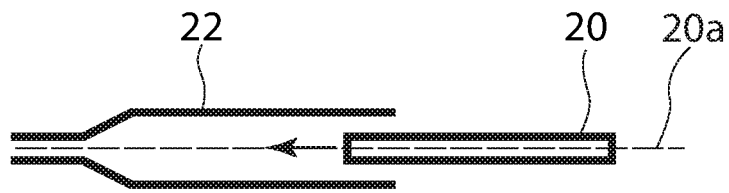
FIG. 5 is a cross sectional schematic side view of an embodiment of a layer of reinforcement material being initially placed on a surface of a tool.

Referring now to FIGS. 5-12, the method 70 (shown in FIG. 4) performed using the system 40 (shown in FIGS. 1-3) will be illustrated. FIG. 5 shows the tool, in the form of the rectangular cross section elongate mandrel 20. In particular embodiments, the mandrel 20 may be arcuate; however, the mandrel 20 can have any suitable shape. The first layer 50 of reinforcement material, in the exemplary form of a tubular braided carbon fibre sleeve 22, is placed 71 on the outer surface 21 of the mandrel 20, enveloping the mandrel 20. However, the sleeve 22 may not completely envelope the mandrel 20, but rather the sleeve 22 can at least partially cover the outer surface 21 of the mandrel 20. For example, side surfaces of the mandrel 20 can be covered by the sleeve 22 while the end surfaces of the mandrel 20 are not covered by the sleeve 22. The reinforcement material can be in the form of tape, fabric, wound filament, and/or fibreglass formed into the sleeve 22 or into another suitable configuration, such as a sheet.

Figure 6:
FIG. 6 is a cross sectional schematic side view of the layer of reinforcement material shown in FIG. 5 after completion of placement on the tool surface.

FIG. 6 shows the sleeve 22 being tensioned 72 to conform the sleeve 22 to the shape of the outer surface of the mandrel 20. More specifically, lateral force is applied relative to each end of the sleeve 22 by pulling the ends away from each other. The lateral force applied elongates the sleeve 22 and circumferentially shrinks the sleeve 22 onto the outer surface 21 of the mandrel 20. The lateral force can be applied manually by gripping ends 22a and 22b of the sleeve 22 and extending the sleeve 22 along an axis 22c aligned with a length-wise direction of the sleeve 22. For example, the first end 22a of the sleeve 22 can be restrained, for example by clamping, and the second end 22b of the sleeve can be pulled away from the first end 22a along the axis 22c. An automated device can also be used to apply the relative lateral forces to the ends 22a and/or 22b of the sleeve 22 to extend the sleeve 22 along the axis 22c and apply a tension load to the sleeve 22.

Figure 7:
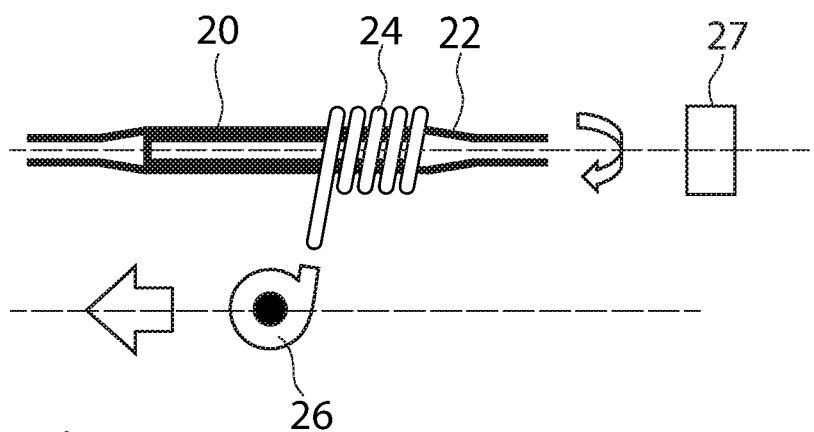
FIG. 7 is a cross sectional schematic side view of the layer of reinforcement material and tool shown in FIG. 6 during wrapping by layer of veil material.

FIG. 7 shows veil material, in the form of a roll of veil material 24 wound onto a spool 26, being wrapped 74 around the sleeve 22. More specifically, the veil material 24 is wrapped around the sleeve 22 while the sleeve 22 is positioned on the mandrel 20. In the embodiment shown in FIGS. 2 and 3, the mandrel 20 and sleeve 22 remain longitudinally stationary whilst the drive device 27 axially rotates the mandrel 20 and the sleeve 22. A spool 26 of the veil material 24 is longitudinally advanced relative to the mandrel 20 and sleeve 22 by the drive device 27 to spirally wrap the veil material 24 around the sleeve 22. In an alternative embodiment, not shown, the spool 26 remains longitudinally stationary and the drive device 27 moves the mandrel 20 and sleeve 22 longitudinally relative to the spool 26.

The cutting device 31 cuts 75 the veil material 24 when the wrapping of the sleeve 22 is completed.

The steps shown in FIGS. 5 to 7 can be repeated to build up a desired thickness of the composite layup 23 (shown in FIG. 10 and described below). During the wrapping step 74, shown in FIG. 7, the speed of the relative axial rotation and the relative longitudinal movement between the mandrel 20 and the sleeve 22 relative to the veil material 24 can be maintained substantially constant during the wrapping. By maintaining a substantially constant speed, a substantially spacing between adjacent pitches of the veil material 24 is achieved. As an alternative or addition, a substantially constant overlap of the adjacent pitches of veil material 24 can be achieved.

The speeds of the relative axial rotation and the relative longitudinal movement between the mandrel 20 and the sleeve 22 can also be varied during the wrapping so as to provide a variable spacing, or variable overlap, of adjacent pitches of the veil material 24. The latter allows the amount of veil material 24 applied to be varied so as to for example, provide areas of relatively higher strength and relatively lower strength within the composite structure. Alternatively or additionally, the veil material 24 can be applied to a part of the sleeve 22 at a constant speed and to another part of the sleeve 22 at a variable speed.

Figure 8:
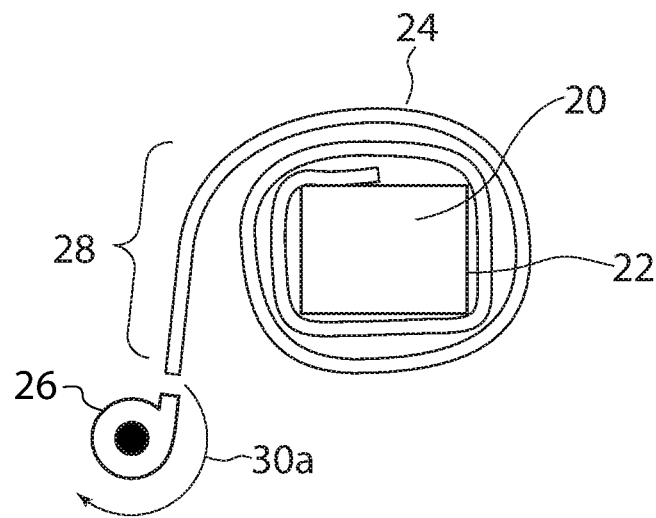
FIG. 8 is a schematic cross sectional end view of the components shown in FIG. 7 showing a first tensioner arrangement.
Figure 9:
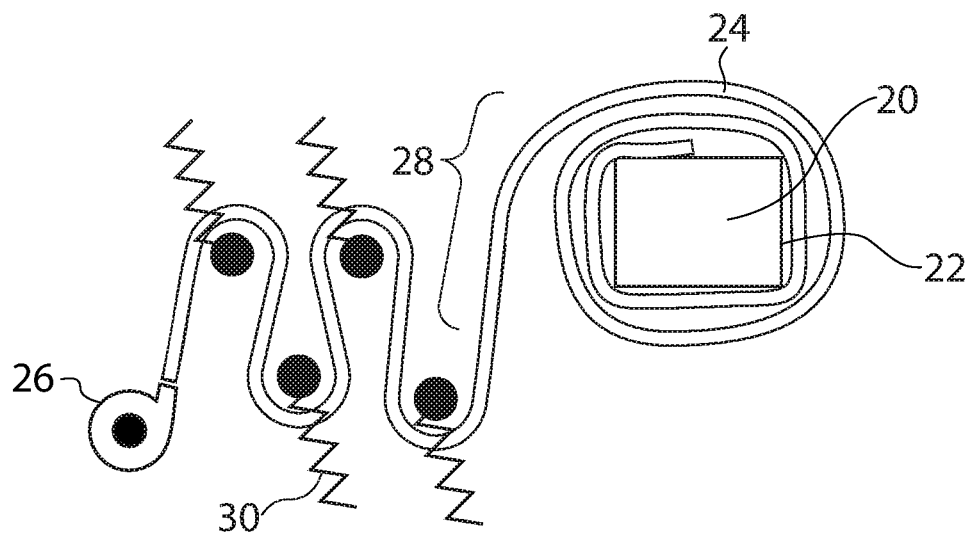
FIG. 9 is a schematic cross sectional end view of the components shown in FIG. 7 showing a second tensioner arrangement.

FIG. 8 shows that, during wrapping 74, tension is applied to the veil material 24, at region 28 of the veil material 24, using brake 30a torque in the spool 26 as the tensioner 30, to resist unspooling. As an alternative, FIG. 9 shows a spring pulley arrangement 30b, used as the tensioner 30 to apply tension to the veil material 24 in the region 28. The magnitude of the tension force can be maintained constant during the entire wrapping process and/or can be varied at different time periods during the wrapping process in order to best suit the application of the veil material 24 to the sleeve 22. More particularly, the tension applied to the veil material 24 as the veil material 24 is wrapped around each layer 50, 52 of the reinforcement material is controlled to ensure desired application and coverage of each layer 50, 52 of the reinforcement material. The controlling of the tension in turn controls features and properties such as the thickness and morphology of the layer 54, 58 of the veil material 24. The morphology is the structure of the filaments in the network of the veil material 24.

The location of the veil material 24 is also controlled as the veil material 24 is applied to the reinforcement material to ensure desired control of the coverage of the veil material 24 within each layer. In the case of automated layup, an exemplary method of controlling the location would be through accurate indexing and locating of the mandrel 20 or holding the veil material 24 with respect to the tooling holding the mandrel 20. The indexing and locating may follow a pre-determined path to apply the veil material 24 at a fixed translation speed relative to the mandrel 20 and feed rate of the veil material 24 as the veil material 24 is unspooled from the spool 26.

An alternative exemplary method is a real-time automated system that uses visual tracking and active feedback to control the application and location of the veil material 24 as the veil material 24 is wrapped around the layer 50 or layers 50, 52 of reinforcement material. Visual tracking could be used to detect and control features such as the edges of the veil material 24 with respect to the edge of the previous spiral applied to the reinforcement material, or detection of the applied layer of veil material 24 using for example the contrast between veil and un-covered (bare) reinforcement material. The visual tracking could be achieved using optical tracking using a camera either mounted on a robot or alternatively a fixed camera mounted separately to both the mandrel 20 and a robot. In both cases, the use of software allows for active tracking and feedback for the location of the veil material 24 as the veil material 24 is applied on the layer 50 or layers 50, 52 of reinforcement material.

Figure 10:
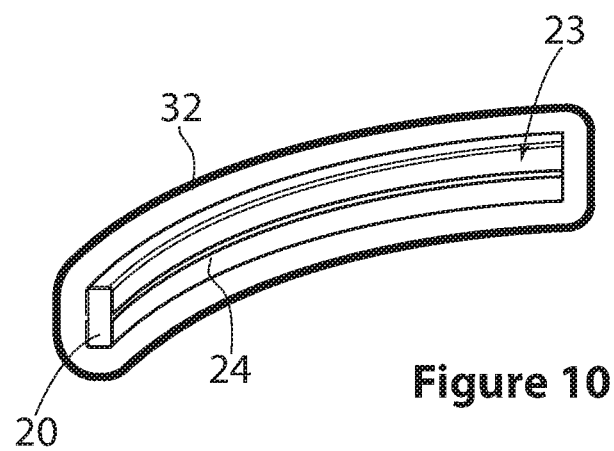
FIG. 10 is perspective schematic view of the wrapped components shown in FIG. 7 at the commencement of curing.

FIG. 10 shows the mandrel 20 after the wrapping 74 of the veil material 24 is complete to thus form at least a first layer 54 of veil material 24 on the layer 50 of reinforcement material. The layer 54 of veil material 24 on the layer 50 of reinforcement material forms the reinforced ply 56. One or more reinforced plies 56, 60 form the composite layup. FIG. 10 also shows the wrapped mandrel 20 after placement 78 within a vacuum bag 32.

An optional intermediating heating step 76 can be performed to create a stabilized preform (e.g., a stabilised, uncured composite layup) from the at least one reinforced ply 56 and/or 60 or from the composite layup 23. In particular embodiments, the first reinforced ply 56 can be made into a first stabilized preform using an intermediate heating cycle, and then the second reinforced ply 60 can be applied to the first stabilized preform. Alternatively, the composite layup 23 of a plurality of reinforced plies 56, 60 can be formed, then the reinforced plies 56, 60 can together be made into a stabilized preform using an intermediate heating cycle. As used herein, an "intermediate heating cycle" is a heating cycle that does not fully cure the composite layup 23 to make the final composite structure 38.

Figure 11:
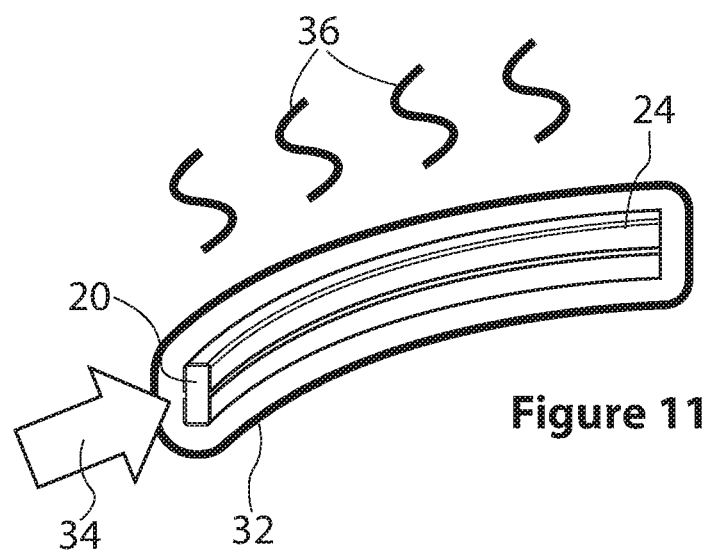
FIG. 11 is perspective schematic view of the wrapped components shown in FIG. 10 during curing.

FIG. 11 shows the injection 80 or infusion 80 of a resin 34 to form a resin injected composite layup or resin infused composite layup respectively. FIG. 11 also shows the application of heat 36 to cure 82 the resin and the composite layup into the composite structure 38 (shown in FIG. 12).

Figure 12:
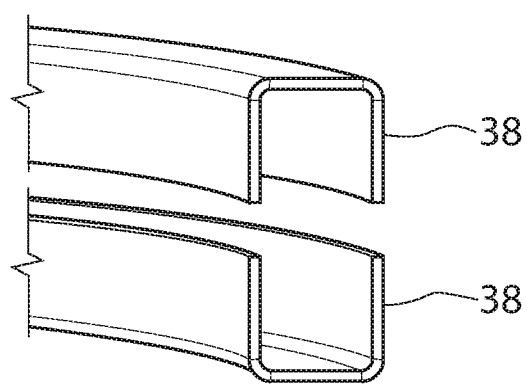
FIG. 12 is perspective schematic view of the wrapped components shown in FIG. 11 after curing and release from the tool.

FIG. 12 shows an exemplary pair of the composite structures 38 produced after the resin 34 has cured 82 and after trimming and removal 84 of the mandrel 20. The pair of composite structures 38 is one example of a composite structure 38 that can be formed using the system 40 and method 70 described herein.

Turning now to FIG. 13, there is shown the composite structure 38 that can be manufactured using the system 40 and method 70 described herein. The composite structure 38 includes at least the first layer 50 of reinforcement material shaped by the surface 21 of the mandrel 20, and at least the first layer 54 of veil material wrapped around the shaped first layer 50 of reinforcement material. The first layer 50 of reinforcement material having the wrapped first layer 54 of veil material forms the first reinforced ply 56. Resin is added to the first reinforced ply 56 to form the composite structure 38 after curing the resin.

When the composite structure 38 is layered, the composite structure 38 includes at least the second layer 52 of reinforcement material positioned around the first reinforced ply 56 and at least the second layer 58 of veil material wrapped around the second layer 52 of reinforcement material. The second layer 52 of reinforcement material having the wrapped second layer 58 of veil material forms the second reinforced ply 60 on the first reinforced ply 56. The layer 54 and/or layer 58 of reinforcement material is shaped by the surface 21 of the mandrel 20, when the mandrel 20 is used as the tool. The resin can be infused or injected to the reinforced ply 56 and/or 60.

At least some possible advantages of the system and method described above is that they provide improved and tailorable mechanical properties and toughness (thereby offering more weight efficient aircraft structures) through the use of the later or layers of the veil material, which is also able to be manufactured using lower cost and automatable manufacturing methods, specifically with low viscosity resin systems and low pressure (non-autoclave) curing methods. This reduces the fabrication cost of composite structures, such as composite parts, as the method and system described herein avoid the traditionally complex manual layup process.

Further, the use of a spiral wound layer of veil material, which can be applied during the fabrication process, may be advantageous for certain types of composite parts and certain material formats because the veil material does not have to be applied to the raw fabric material prior to layup. When veil material is melt bonded onto a flat fabric for example, the material becomes significantly more stabilised and less easily able to be formed over complex shapes or tools. For certain applications, such as aircraft skins, having a stable format (e.g., a preform) may be beneficial because the material may be better handled during layup. However, for more complex-shaped components, such as aerospace structures, a more formable material format (e.g., dry material) may be more suitable. A specific example is the tubular braided dry fibre sleeve 22, which is able to be placed over the mandrel 20 and then tensioned to conform to the shape of the mandrel 20. Braided tubular formats are a unique fabric format as they are formable and can offer a low cost and partially configured dry fibre material format. If a bonded veil material was applied to the dry braided sleeve or fabric, the bonded veil material would cause the reinforcement material to become stabilised and the reinforcement may not be placed onto a tool in the same manner.

Further, the disclosure comprises embodiments according to the following clauses:

Clause 1. A method of fabricating a composite structure, said method comprising: placing at least a first layer of reinforcement material on a surface of a tool; and wrapping at least a first layer of veil material around the first layer of reinforcement material while the first layer of reinforcement material is positioned on the tool to produce a first reinforced ply.

Clause 2. The method of Clause 1 further comprising placing at least a second layer of reinforcement material on the first layer of veil material while the first reinforced ply is positioned on the tool surface.

Clause 3. The method of Clause 2 further comprising wrapping at least a second layer of veil material around the second layer of reinforcement material while the second layer of reinforcement material is positioned on the tool, the second layer of reinforcement material and the second layer of veil material forming a second reinforced ply on the first reinforced ply.

Clause 4. The method of Clause 1, 2, or 3 wherein the step of placing the first layer of reinforcement material on the tool surface comprises placing the first layer of reinforcement material on a surface of a mandrel.

Clause 5. The method of any one of Clauses 1 to 4 wherein the step of wrapping the layer of veil material comprises relative axial rotation and longitudinal movement between the tool and the underlying layer of veil material to spirally wrap the layer of veil material around the underlying layer of reinforcement material.

Clause 6. The method of Clause 5 wherein the speed of the relative axial rotation and longitudinal movement between the tool and the layer of veil material is substantially constant during the wrapping so as to provide a substantially constant spacing between, or substantially constant overlap of, adjacent pitches of the layer of veil material.

Clause 7. The method of Clause 5 wherein the speed of the relative axial rotation and longitudinal movement between the tool and the layer of veil material is varied during the wrapping so as to provide a variable spacing between, or variable overlap of, adjacent pitches of the layer of veil material.

Clause 8. The method of Clause 5, 6, or 7 wherein the step of wrapping the layer of veil material comprises rotating the tool about an axis, whilst keeping the tool longitudinally stationary, and longitudinally advancing the layer of veil material.

Clause 9. The method of Clause 5, 6, or 7 wherein the step of wrapping the layer or layers of veil material comprises keeping the tool axially and longitudinally stationary whilst rotating the veil material axially around the tool and longitudinally advancing the layer of veil material.

Clause 10. The method of any one of Clauses 4 to 9 wherein the tension applied to the layer or layers of veil material is substantially constant during the wrapping.

Clause 11. The method of any one of Clauses 4 to 9 wherein the tension applied to the layer or layers of veil material is varied during the wrapping.

Clause 12. The method of any one of Clauses 1 to 11 further comprising: adding a resin to at least the first reinforced ply to form a composite layup; and curing the resin in the composite layup to form the composite structure.

Clause 13. The method of Clause 12, wherein the resin is infused to form a resin infused composite layup.

Clause 14. The method of Clause 12, wherein the resin is injected to form a resin injected composite layup.

Clause 15. The method of any one of Clauses 1 to 14 further comprising cutting at least the first layer of veil material at the completion of the wrapping at least the first layer of veil material around the first layer of reinforcement material.

Clause 16. The method of any one of Clauses 1 to 15 further comprising heating at least the first reinforced ply to form at least a first stabilized preform.

Clause 17. A system for fabricating a composite structure, said system comprising: a tool having a surface for supporting at least a first layer of reinforcement material placed on the tool surface; and a wrapping device configured to wrap at least a first layer of veil material around the first layer of reinforcement material while the first layer of reinforcement material is positioned on the tool to produce a first reinforced ply.

Clause 18. The system of Clause 17 wherein the tool is configured to support at least a second layer of reinforcement material on the first reinforced layer.

Clause 19. The system of Clause 18 wherein the wrapping device is configured to wrap at least a second layer of veil material around the second layer of reinforcement material to produce a second reinforced ply on the first reinforced ply.

Clause 20. The system of Clause 17, 18, or 19 wherein the tool comprises a mandrel.

Clause 21. The system of any one of Clauses 17 to 20 further comprising a drive device configured to cause relative axial rotation and longitudinal movement between the tool and the wrapping device such that the layer of veil material is spirally wrapped around the layer of underlying reinforcement material while the underlying layer of reinforcement material is positioned on the tool.

Clause 22. The system of Clause 21 wherein the drive device is configured to provide a substantially constant speed of the relative axial rotation and longitudinal movement between the tool and the wrapping device so as to provide a substantially constant spacing between, or substantially constant overlap of, adjacent pitches of at least one of the first layer of veil material or the second layer of veil material.

Clause 23. The system of Clause 21 wherein the drive device is configured to provide a variable speed of the relative axial rotation and longitudinal movement between the tool and the wrapping device so as to provide a variable spacing between, or variable overlap of, adjacent pitches of at least one of the first layer of veil material and the second layer of veil material.

Clause 24. The system of Clause 21, 22, or 23 wherein the tool is longitudinally stationary and axially rotatable and the wrapping device is longitudinally advanceable and axially stationary.

Clause 25. The system of Clause 21, 22, or 23 wherein the tool is longitudinally and axially stationary tool and the wrapping device is longitudinally advanceable and axially rotatable.

Clause 26. The system of any one of Clauses 17 to 25 further comprising a veil material tensioner adapted to apply tension to at least one of the first layer of veil material and the second layer of veil material relative to the tool.

Clause 27. The system of Clause 26 wherein the tensioner is configured to apply a substantially constant tension to at least one of the first layer of veil material and the second layer of veil material relative to the tool.

Clause 28. The system of Clause 26 wherein the tensioner is configured to apply a variable tension to at least one of the first layer of veil material and the second layer of veil material relative to the tool.

Clause 29. The system of any one of Clauses 17 to 28 further comprising: a resin supplier configured to add a resin to the first reinforced ply to form a composite layup; a heat source configured to heat the composite layup to cure the resin and form the composite structure; and a vacuum bag configured to contain the composite layup during curing.

Clause 30. The system of Clause 29, wherein the resin supplier is configured to infuse the resin to form a resin infused composite layup.

Clause 31. The system of Clause 29, wherein the resin supplier is configured to inject the resin to form a resin injected composite layup.

Clause 32. The system of any one of Clauses 17 to 31 wherein the reinforcement material is formed from carbon fibre.

Clause 33. The system of any one of Clauses 17 to 32 wherein the reinforcement material includes, glass, aramid, silicon carbide, boron, ceramic or metallic fibres.

Clause 34. A composite structure: at least a first layer of reinforcement material shaped by a surface of a tool; and at least a first layer of veil material wrapped around the shaped first layer of reinforcement material, the first layer of reinforcement material having the wrapped first layer of veil material forming a first reinforced ply, wherein resin is added to the first reinforced ply to form a injected composite layup that forms the composite structure after curing the resin.

Clause 35. The composite structure of Clause 34, wherein the resin is infused to form a resin infused composite layup.

Clause 36. The composite structure of Clause 34, wherein the resin is injected to form a resin injected composite layup.

Clause 37. The composite structure of Clause 34, 35, or 36 further comprising at least a second layer of reinforcement material positioned around the first reinforced ply and at least a second layer of veil material wrapped around the second layer of reinforcement material, the second layer of reinforcement material having the wrapped second layer of veil material forming a second reinforced ply on the first reinforced ply.

Clause 38. The composite structure of any one of Clause 34 to 37 wherein the layer or layers of reinforcement material shaped by the surface of the tool are shaped on a mandrel.

Clause 39. The composite structure of any one of Clauses 34 to 38 wherein the reinforcement material is formed from carbon fibre.

Clause 40. The composite structure of any one of Clauses 34 to 38 wherein the reinforcement material includes, glass, aramid, silicon carbide, boron, ceramic or metallic fibres.

Clause 41. A composite structure fabricated in accordance with the method of any one of Clauses 1 to 16.

Clause 42. A composite structure fabricated by the system of any one of Clauses 17 to 33.

Persons skilled in the art will appreciate that the above specific embodiments described above are merely examples of the present disclosure. Persons skilled in the art will appreciate that the various features described in relation to different embodiments may also be used in combination or as alternatives. Persons skilled in the art will also appreciate various other modifications and alternatives to the embodiments described.

The invention claimed is:

1. A method of fabricating a composite structure, the method comprising:
    placing at least a first layer of reinforcement material on a surface of a tool; and
    wrapping at least a first layer of veil material around the first layer of reinforcement material while the first layer of reinforcement material is positioned on the tool to produce a first reinforced ply, wherein the step of wrapping the first layer of veil material comprises relative axial rotation and longitudinal movement between the tool and a spool of veil material to spirally wrap the first layer of veil material around the first layer of reinforcement material such that adjacent pitches of the first layer of veil material overlap one another, and wherein a speed of the relative axial rotation and longitudinal movement between the tool and the spool of veil material is varied during the wrapping so as to provide a variable overlap of adjacent pitches of the first layer of veil material such that an amount of the first layer of veil material applied to the first layer of reinforcement material is varied along a length of the first reinforced ply such that a strength of the first reinforced ply is varied along its length.

2. The method of claim 1, further comprising placing at least a second layer of reinforcement material on the first layer of veil material while the first reinforced ply is positioned on the surface of the tool.

3. The method of claim 2, further comprising wrapping at least a second layer of veil material around the second layer of reinforcement material while the second layer of reinforcement material is positioned on the tool, the second layer of reinforcement material and the second layer of veil material forming a second reinforced ply on the first reinforced ply.

4. The method of claim 1, wherein the step of placing the first layer of reinforcement material on the surface of the tool comprises placing the first layer of reinforcement material on a surface of a mandrel.

5. The method of claim 1, wherein the step of wrapping the first layer of veil material comprises rotating the tool about an axis, whilst keeping the tool longitudinally stationary, and longitudinally advancing the first layer of veil material.

6. The method of claim 1, wherein the step of wrapping the first layer of veil material comprises keeping the tool axially and longitudinally stationary whilst rotating the veil material axially around the tool and longitudinally advancing the first layer of veil material.

7. The method of claim 1, further comprising:
adding a resin to at least the first reinforced ply to form a composite layup; and
curing the resin in the composite layup to form the composite structure.

8. The method of claim 1, further comprising intermediately heating at least the first reinforced ply to form at least a first stabilized preform.

9. A system for fabricating a composite structure, the system comprising:
a tool having a surface for supporting at least a first layer of reinforcement material placed on the tool surface;
a wrapping device configured to wrap at least a first layer of veil material around the first layer of reinforcement material while the first layer of reinforcement material is positioned on the tool to produce a first reinforced ply; and
a drive device configured to cause relative axial rotation and longitudinal movement between the tool and the wrapping device such that the first layer of veil material is spirally wrapped around the first layer of reinforcement material while the first layer of reinforcement material is positioned on the tool such that adjacent pitches of the first layer of veil material overlap one another, wherein the drive device is configured to provide a variable speed of the relative axial rotation and longitudinal movement between the tool and the wrapping device so as to provide a variable overlap of adjacent pitches of the first layer of veil material such that an amount of the first layer of veil material around the first layer of reinforcement material is varied along a length of the first reinforced ply such that a strength of the first reinforced ply is varied along its length.

10. The system of claim 9, wherein the tool is configured to support at least a second layer of reinforcement material on the first layer of reinforced material.

11. The system of claim 10, wherein the wrapping device is configured to wrap at least a second layer of veil material around the second layer of reinforcement material to produce a second reinforced ply on the first reinforced ply.

12. The system of claim 9, further comprising a veil material tensioner adapted to apply tension to at least one of the first layer of veil material and a second layer of veil material relative to the tool.

13. The system of claim 9, further comprising:
a resin supplier configured to add a resin to the first reinforced ply to form a composite layup;
a heat source configured to heat the composite layup to cure the resin and form the composite structure; and
a vacuum bag configured to contain the composite layup during curing.

14. The method of claim 1, further comprising:
applying tension to the first layer of veil material prior to wrapping the first layer of veil material around the first layer of reinforcement material.

15. The system of claim 12, wherein the veil material tensioner is configured to vary a magnitude of the tension applied to at least one of the first layer of veil material and a second layer of veil material relative to the tool at different time periods during the wrapping process.

16. The system of claim 12, wherein the tension applied to at least one of the first layer of veil material and a second layer of veil material relative to the tool is constant throughout the wrapping process.

17. The method of claim 14, wherein a magnitude of the tension applied to the first layer of veil material is configured to vary at different time periods during the wrapping process.

18. The method of claim 2, further comprising:
applying tension to the second layer of veil material prior to wrapping the second layer of veil material around the second layer of reinforcement material.

19. The method of claim 18, wherein a magnitude of the tension applied to the second layer of veil material is configured to vary at different time periods during the wrapping process.

20. The system of claim 12, wherein the veil material tensioner comprises a brake configured to control a spool in the wrapping device.

* * * * *